(12) United States Patent
Huang

(10) Patent No.: US 9,135,684 B2
(45) Date of Patent: Sep. 15, 2015

(54) SYSTEMS AND METHODS FOR IMAGE ENHANCEMENT BY LOCAL TONE CURVE MAPPING

(71) Applicant: Marvell World Trade Ltd., St. Michael (BB)

(72) Inventor: Samson Huang, Saratoga, CA (US)

(73) Assignee: MARVELL WORLD TRADE LTD., St Michael (BB)

( * ) Notice: Subject to any disclaimer, the term of this patent is extended or adjusted under 35 U.S.C. 154(b) by 0 days.

(21) Appl. No.: 14/076,577

(22) Filed: Nov. 11, 2013

(65) Prior Publication Data
US 2014/0133776 A1    May 15, 2014

Related U.S. Application Data

(60) Provisional application No. 61/725,182, filed on Nov. 12, 2012.

(51) Int. Cl.
G06K 9/40        (2006.01)
G06T 5/00        (2006.01)

(52) U.S. Cl.
CPC ............... *G06T 5/002* (2013.01); *G06T 5/007* (2013.01); *G06T 2207/20016* (2013.01); *G06T 2207/20021* (2013.01)

(58) Field of Classification Search
CPC ..... G09G 3/20; G09G 3/2044; G09G 3/3406; G09G 2320/0271; G09G 2320/0646; G09G 2320/066; G09G 2320/0673; H04N 5/332; H04N 5/57; H04N 5/58; H04N 9/045; H04N 9/68; H04N 9/69; H04N 9/77; G06T 5/002; G06T 5/008; G06T 5/009; G06T 5/10; G06T 5/20; G06T 5/40
See application file for complete search history.

(56) References Cited

U.S. PATENT DOCUMENTS

| 4,754,323 | A  | * | 6/1988  | Kaji et al.      | 348/256 |
|-----------|----|---|---------|------------------|---------|
| 5,523,785 | A  |   | 6/1996  | Muramoto         |         |
| 7,253,836 | B1 | * | 8/2007  | Suzuki et al.    | 348/234 |
| 7,440,612 | B2 | * | 10/2008 | Ogata et al.     | 382/167 |
| 7,609,282 | B2 | * | 10/2009 | Aoki et al.      | 345/690 |
| 7,839,406 | B2 | * | 11/2010 | Kerofsky         | 345/473 |
| 8,103,120 | B2 | * | 1/2012  | Choi et al.      | 382/274 |
| 8,417,046 | B1 |   | 4/2013  | McDougal et al.  |         |
| 2007/0229863 | A1 |   | 10/2007 | Ono et al.     |         |
| 2010/0085361 | A1 |   | 4/2010  | Kim et al.     |         |
| 2011/0279643 | A1 |   | 11/2011 | Inamura         |         |

OTHER PUBLICATIONS

International Search Report and Written Opinion dated Jul. 11, 2014 from related/corresponding International Patent Appl. No. PCT/IB2013/003044 filed Nov. 11, 2013.

(Continued)

*Primary Examiner* — Jose Couso

(57) ABSTRACT

Systems and methods are provided for a method of adjusting a digital image. A low pass filtering is performed on a digital image to remove high frequency data to generate filtered image data. The digital image is divided into a plurality of regions, and a brightness level of a particular region of the digital image is identified using the filtered image data. A transformation curve is selected for the particular region based on the brightness level, and the transformation curve is applied to the particular region to generate adjusted image data for the particular region having adjusted brightness. The adjusted image data is stored in a computer-readable medium.

20 Claims, 8 Drawing Sheets

(56) References Cited

OTHER PUBLICATIONS

Moroney N: "Local Color Correction Using Non-Linear Masking". IS&T/SID Eight Color Imaging Conference, Jan. 1, 2000, pp. 108-111.

Li Tao, Vijayan K. Asari: "Adaptive and intergrated Neighborhood-dependent Approach for Nonlinear Enhancement of Color Images", Journal of Electronic Imaging, vol. 14, No. 4, Dec. 12, 2005.

Zicong Mai et al; Tone-mapping high dynamic range images and videos for bit-depth scalable coding and 3D displaying. Jul. 1, 2012, Retrieved form the Internet URL: http://hd1.handle.net/2429/42630 [retrieved on Jul. 3, 2014].

* cited by examiner

SYSTEMS AND METHODS FOR IMAGE ENHANCEMENT BY LOCAL TONE CURVE MAPPING

CROSS-REFERENCE TO RELATED APPLICATIONS

The present application claims priority from U.S. Provisional application Ser. No. 61/725,182 entitled "Image Enhancement By Local Tone Curve Mapping with Better Color Preservation," filed 12 Nov. 2012, the entirety of which is hereby incorporated by reference.

FIELD

This disclosure is related generally to image processing and more particularly to image contrast adjustment.

BACKGROUND

Digital cameras are often limited in their dynamic range. Such limitations can result in sub-par picture quality, especially in high contrast or high dynamic range photography settings, where especially bright or dark areas of a photograph tend to overpower other portions, resulting in a loss of color and detail. The human eye has a dynamic range of about 1,000,000:1, while 8-bit digital cameras often have a range of at most 255:1. Thus, current cameras cannot deal with this issue at the time of image capture. While post-capture processing has been attempted, such processing often fails to improve picture detail to an acceptable level.

SUMMARY

Systems and methods are provided for a computer-implemented method of adjusting a digital image. A low pass filtering is performed on a digital image to remove high frequency data to generate filtered image data. The digital image is divided into a plurality of regions, and a brightness level of a particular region of the digital image is identified using the filtered image data. A transformation curve is selected for the particular region based on the brightness level, and the transformation curve is applied to the particular region to generate adjusted image data for the particular region having adjusted brightness. The adjusted image data is stored in a computer-readable medium.

As another example, a system for adjusting a digital image includes a computer-readable storage medium configured for storage of an unadjusted digital image. A low pass filter is configured to remove high frequency data from the unadjusted digital image to generate filtered image data. A brightness identification module is configured to identify a brightness level of a particular region of the digital image using the filtered image data, and a data processor is configured to apply a transformation curve to the particular region to generate adjusted image data for the particular region that has an adjusted brightness, the transformation curve being selected based on the identified brightness of the particular region. A computer-readable storage medium is configured to store the adjusted image data.

DETAILED DESCRIPTION

Figure 1:
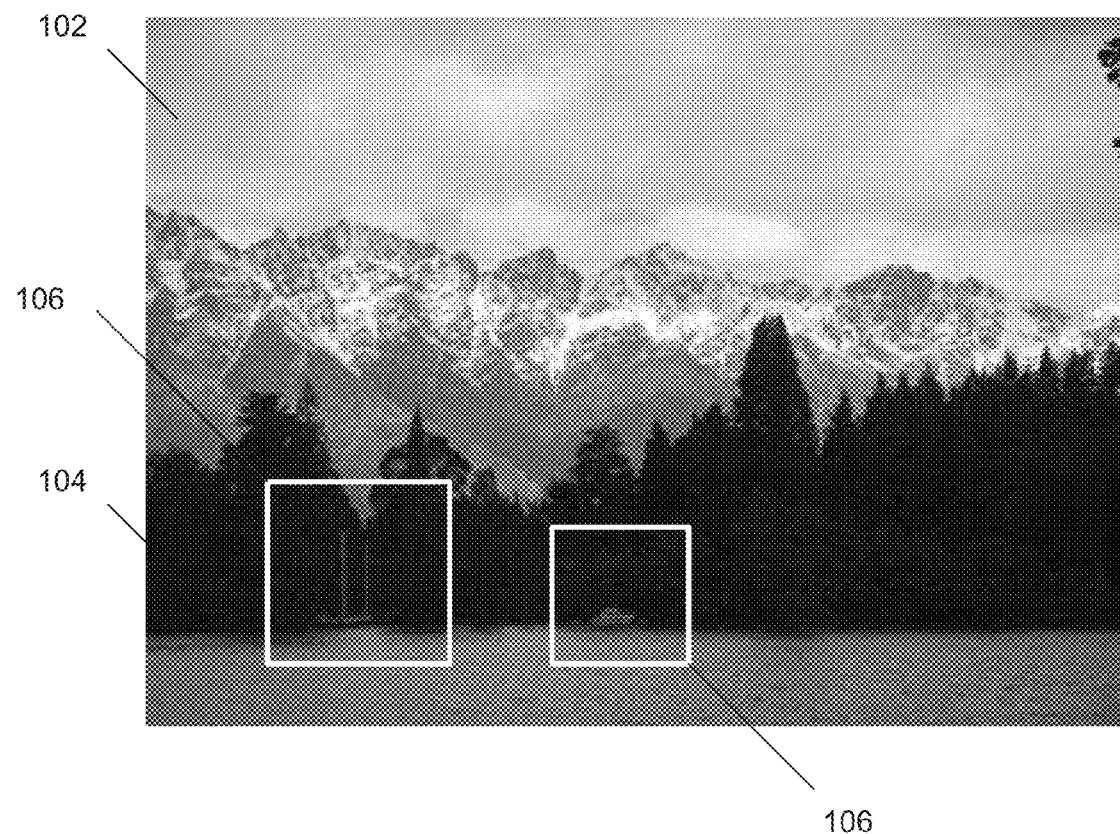
FIG. 1 is an example photograph prior to brightness adjustment.

FIG. 1 is an example photograph prior to brightness adjustment. The photograph includes bright sky and mountain portions 102 and dark tree portions 104. The photograph also includes high detail portions where two boats 106 are depicted. The broad range of brightness from the sky portion 102 to the tree portion 104 extends beyond the dynamic range of the digital camera, resulting in a loss of color and detail quality. In one method, the bright portions 102 of the photograph are darkened and the dark portions 104 are brightened, where the magnitude of adjustment is based on the magnitude of corresponding brightness or darkness in the original photograph. While such a global adjustment method can improve picture quality, further improvement can be achieved through localized contrast adjustment and special treatment of high detail portions 106 of the photograph.

Figure 2:
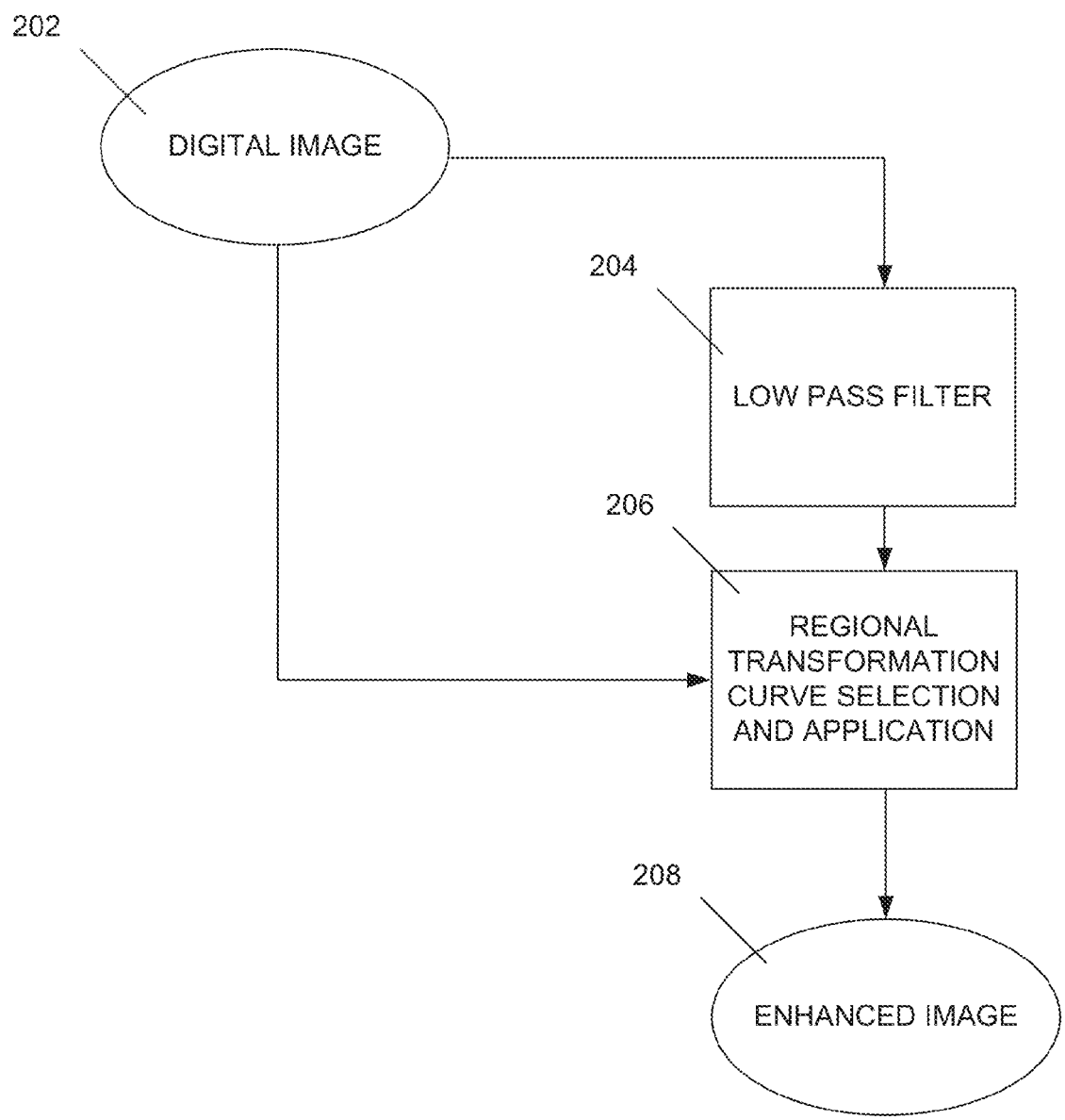
FIG. 2 is a block diagram depicting a system for adjusting a digital image.

FIG. 2 is a block diagram depicting a system for adjusting a digital image 202. The system includes a low pass filter 204. Because darkness and brightness tend to be a macro-phenomenon in a digital image 202, such as the photograph depicted in FIG. 1, the low pass filter 204 is configured to remove high frequency data (i.e., pixel values that have wide variations within a small area, such as the boat areas 106 in FIG. 1) for downstream analysis of whether a region of the digital image 202 is a dark region or a bright region.

Figure 3A:
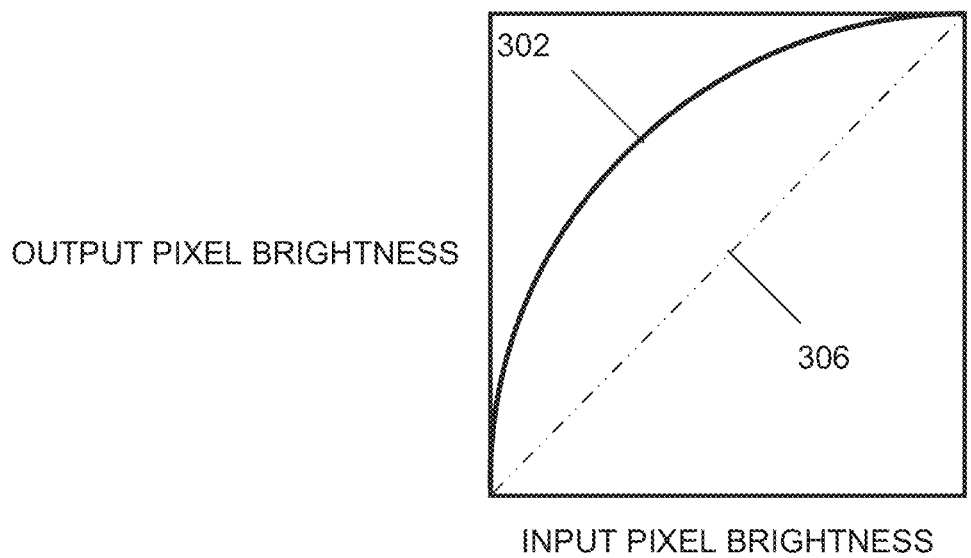
FIGS. 3A and 3B depict example transformation curves.
Figure 3B:
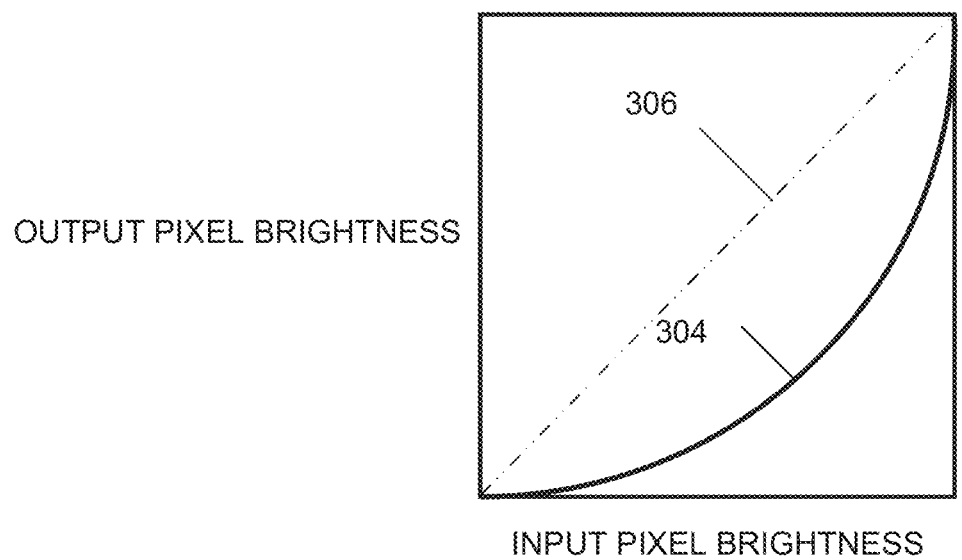

At 206, the digital image 202 is divided into a plurality of regions, where regions can be configurably sized, down to a single pixel in size. A transformation curve is selected for each of the regions using the image data filtered by the low pass filter 204. FIGS. 3A and 3B depict example transformation curves. The transformation curve 302 of FIG. 3A brightens pixels in a region, with darker pixels being brightened more than brighter pixels in the region. Because the transformation curve 302 of FIG. 3A is entirely above a neutral diagonal adjustment line 306, the transformation curve 302 of FIG. 3A only brightens pixels in the region. The transformation curve 304 of FIG. 3B darkens pixels in a region, with brighter pixels being darkened more than darker pixels in the region. Because the transformation curve 304 of FIG. 3B is entirely below a neutral diagonal adjustment line 306, the transformation curve 304 of FIG. 3B only darkens pixels in the region. Each region of the digital image 202 is analyzed to determine a brightness level of that region.

In one example, an average brightness is determined for a region based on am average brightness of all pixels in the region. That regional brightness is compared to one or more thresholds to select a transformation curve (e.g., the transformation curve of FIG. 3A is selected for regions identified as dark regions, while the transformation curve of FIG. 3B is selected for regions identified as bright regions). The transformation curve is then applied to the pixels in the region to generate adjusted image data. Selected transformation curves are applied to each of the regions of the digital image 202 to generate a collection of adjusted image data that forms an enhanced image 208. Application of the selected transformation curves, where pixels are darkened in bright regions and brightened in dark regions, tends to reduce the total brightness range (i.e., the difference in brightness of the brightest pixel to the darkest pixel) of the digital image 202, where controlled adjustment can improve the quality in the enhanced image 208.

Figure 4:
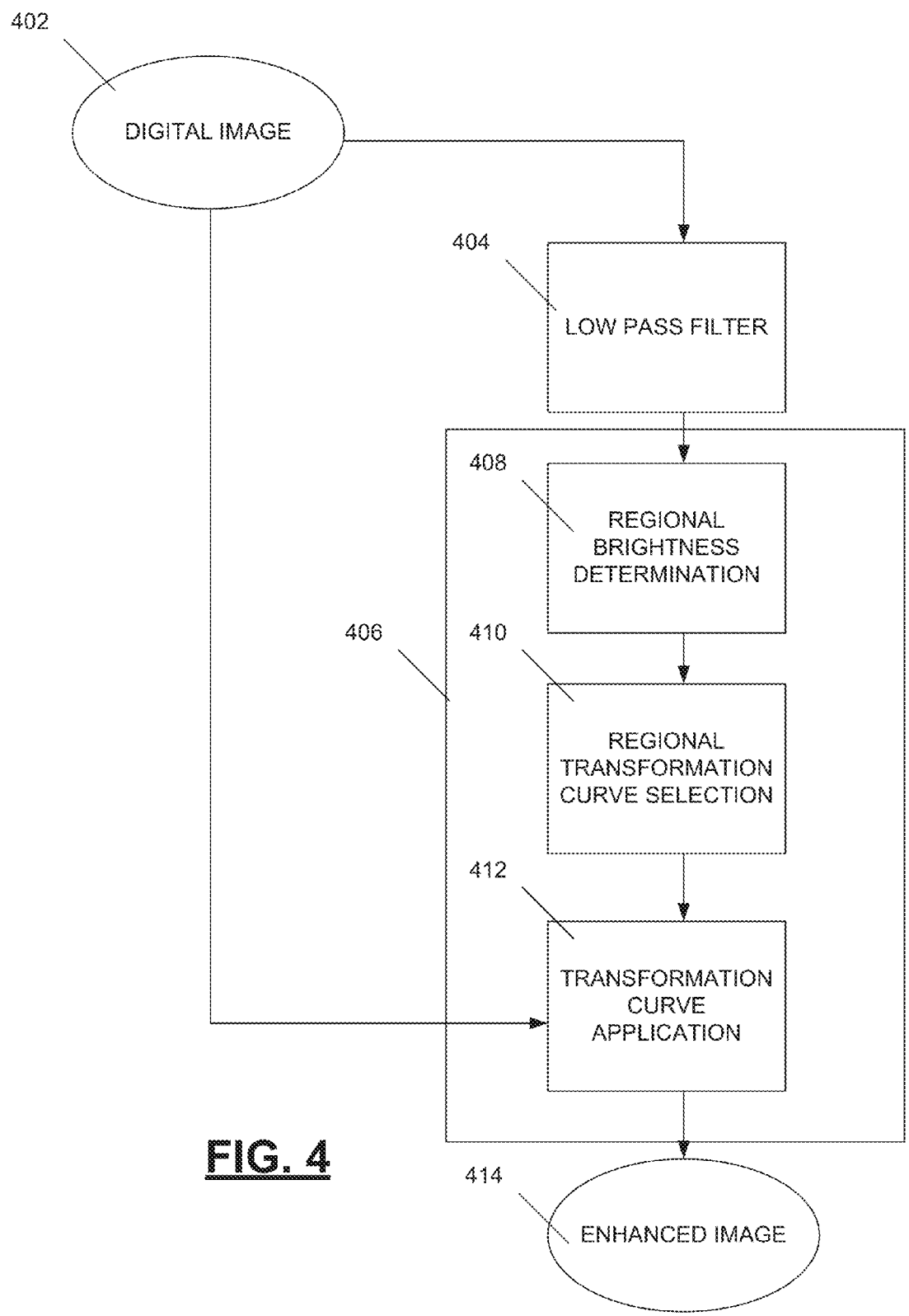
FIG. 4 is a block diagram depicting additional details of regional transformation curve selection and application.

FIG. 4 is a block diagram depicting additional details of regional transformation curve selection and application. A digital image 402 is provided to a low pass filter 404 to remove high frequency data from the digital image 402 to generate filtered image data. Regional transformation curve selection and application is applied at 406 at 408, 410, 412. At 408, the digital image is divided into a plurality of regions, and a brightness level is identified for each of the regions of the digital image using the filtered image data from the low pass filter 404. At 410, a transformation curve is selected for each of the regions based on the brightness level identified for that region at 408. At 412, a selected transformation curve is applied to each region by modifying each pixel of the digital image 402 in that region according to the selected transformation curve, resulting in the pixels in that region having an adjusted brightness, as represented in the adjusted image data outputted at 412. The adjusted image data from each of the regions of the digital image 402 is combined to form an enhanced image 414, where that adjusted image data is stored in a computer-readable medium.

Figure 5:
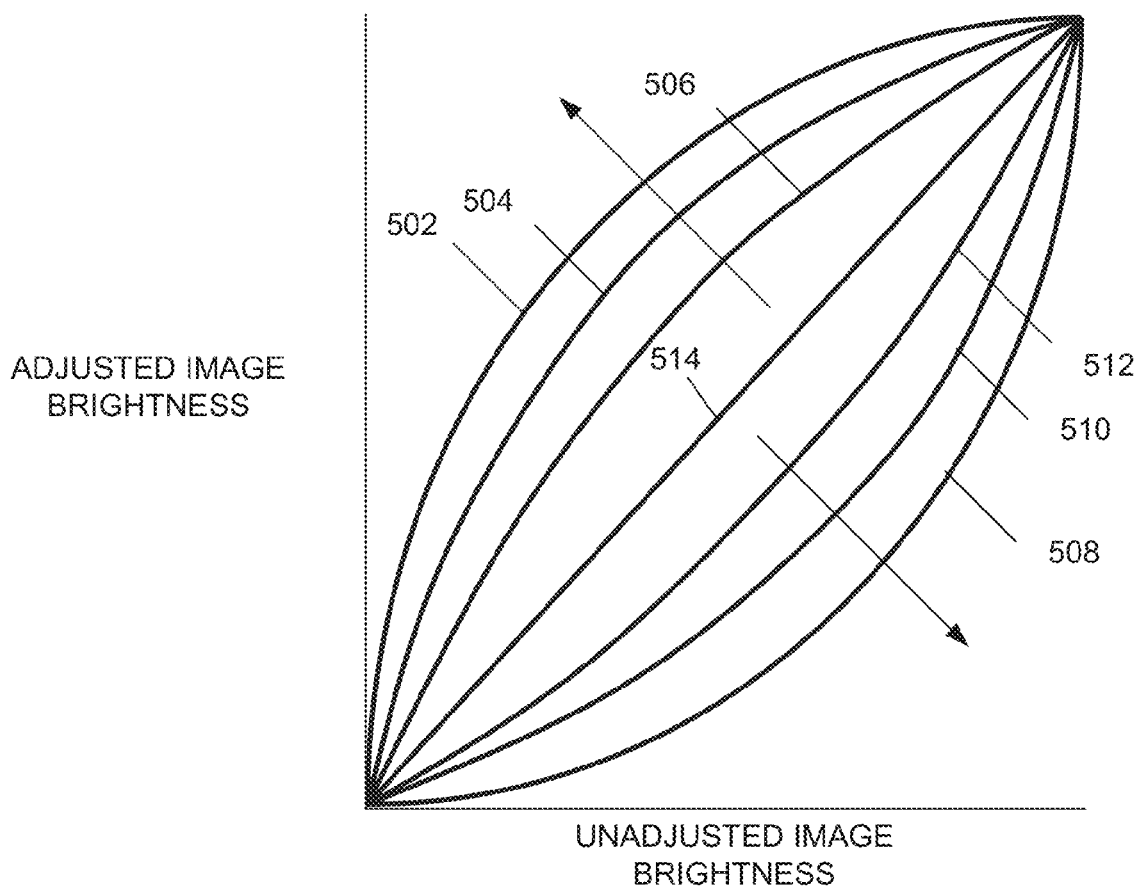
FIG. 5 depicts a menu of seven transformation curves that can be applied to individual regions of a digital image.

While single brightening (e.g., FIG. 3A) and darkening (e.g., FIG. 3B) transformation curves, regionally applied, can significantly improve image quality, in some examples, image quality is further improved through selection of transformation curves from a larger population of candidate transformation curves. FIG. 5 depicts a menu of seven transformation curves that can be applied to individual regions of a digital image. Each region of a digital image is identified as having a particular brightness level. When a particular region is identified as being a dark region, one of transformation curves 502, 504, 506 is selected for application. When a region is identified as being very dark (i.e., beyond a threshold level of darkness), information curve 502 is applied to pixels in that region to provide a greatest degree of brightening. When a region is identified as being in an intermediate range of darkness, transformation curve 504 is selected, and when a region is identified as being in a slightly dark range, transformation 506 is selected. Similarly, when a region is identified as being very bright (i.e., beyond a threshold level of brightness), transformation curve 508 is applied to pixels in that region to provide a greatest degree of darkening. When a region is identified as being in an intermediate range of brightness, transformation curve 510 is selected, and when a region is identified as being in a slightly bright range, transformation curve 512 is selected. When a region is identified as being in a neutral range of brightness/darkness transformation curve 514 is selected, where transformation curve 514 applies no adjustment to pixels in a corresponding region (i.e., an output pixel value is equal to its input pixel value).

Figure 6:
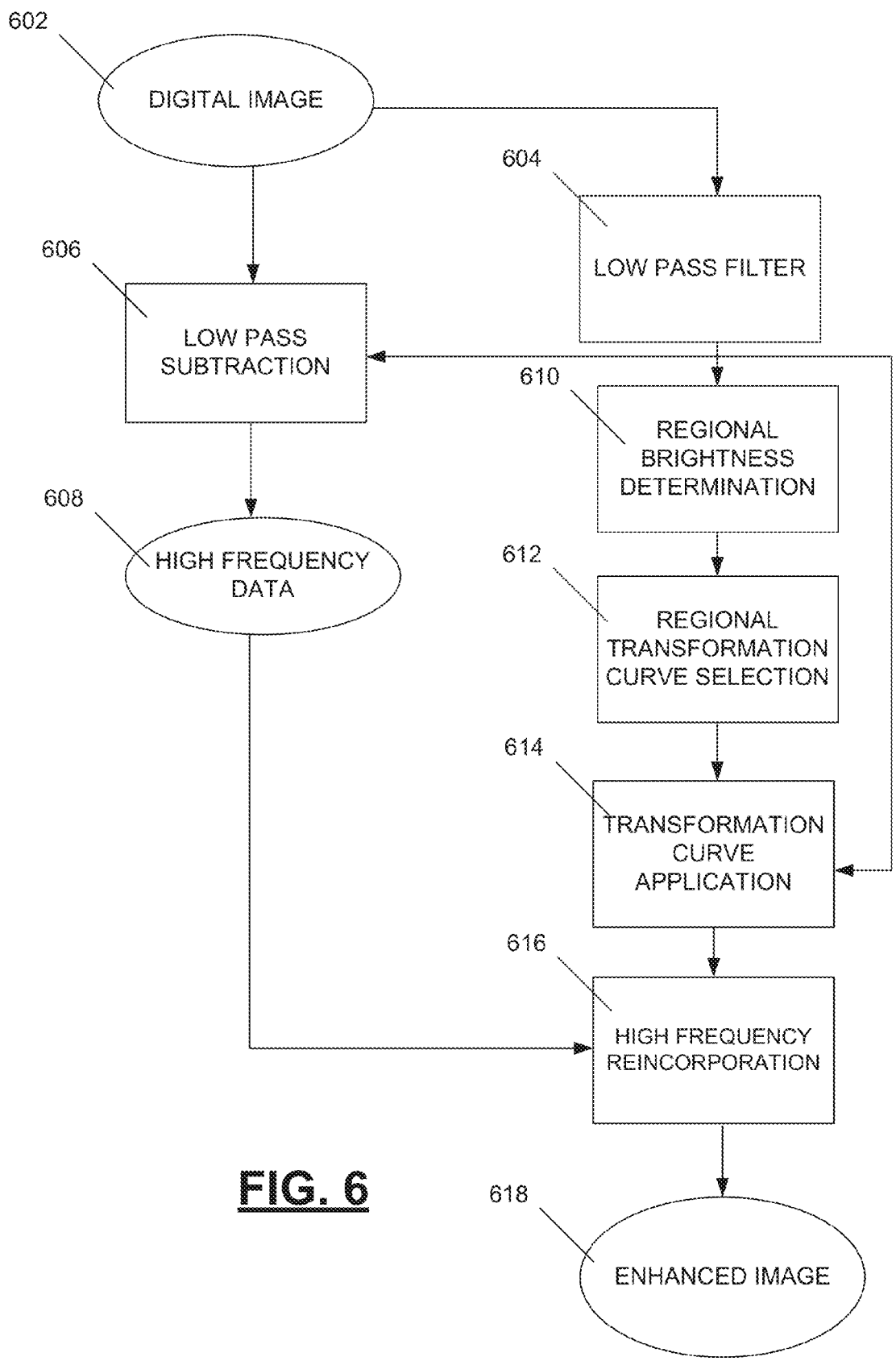
FIG. 6 is a block diagram depicting a system where transformation curves are applied to the low pass filtered version of the digital image, with the high frequency, detailed portions of the digital image being reincorporated following application of the transformation curve.

In the examples of FIGS. 2 and 4, the transformation curves are applied directly to regions of the digital image 202, 402. In the example of FIG. 6, transformation curves are applied to the low pass filtered version of the digital image, with the high frequency, detailed portions of the digital image being reincorporated following application of the transformation curve. A digital image 602 is provided to a low pass filter 604 to remove high frequency data from the digital image 602 as filtered image data. The filtered image data is provided to a low pass subtraction module 606, where the data that remains following the low pass filtering at 604 is subtracted from the digital image 602, such that only the high frequency data 608 of the digital image 602 remains.

At 610, the filtered image data from 604 is further processed, where the digital image 602 is divided into a plurality of regions, and a brightness level is identified for each of the regions using the filtered image data. At 612, a transformation curve is selected for each of the regions based on the associated brightness level for that region.

At 614, a selected transformation curve is applied to the filtered form of each region to generate adjusted image data that has an adjusted brightness. Because the transformation curve is applied to the filtered image data, no transformation curve adjustment is made to the high frequency data 608. At 616, the high frequency data 608 is reincorporated into the adjusted image data, such as via an addition or multiplication operation to complete the enhanced image 618, whose data is stored in a computer-readable storage medium.

In addition to providing enhanced image quality over traditional image processing methods, systems and methods as described herein can perform adjustments resulting in a substantially lower display power. Some prior image processing methods have attempted to improve image quality by brightening dark portions of an image or brightening all portions of an image. While such methods may provide marginally improved results, these methods also may increase power requirements for display devices, because brighter pixels often require more energy to display. Systems and methods as described herein may tend to brighten and darken pixels at a comparable rate, such that the resulting power requirements for displaying an enhanced image are substantially similar as the requirements for display of an unadjusted digital image.

Figure 7:
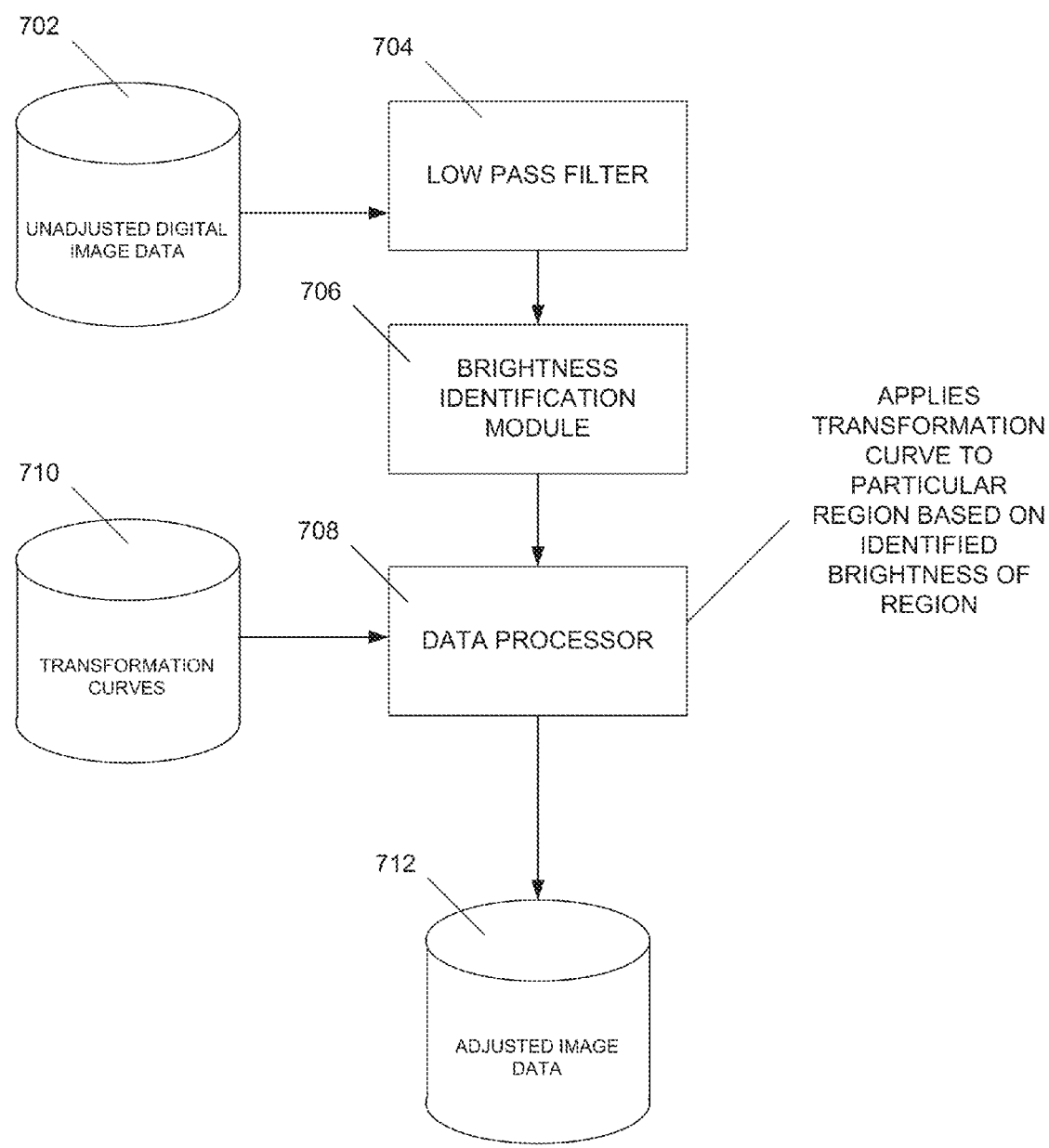
FIG. 7 is a block diagram depicting a computer-implemented system for adjusting a digital image.

FIG. 7 is a block diagram depicting a computer-implemented system for adjusting a digital image. The system includes a computer-readable storage medium 702 configured tier storage of an unadjusted digital image. A low pass filter 704 is configured to remove high frequency data from the unadjusted digital image to generate filtered image data. A brightness identification module 706 is configured to identify a brightness level of a particular region of the digital image using the filtered image data. A data processor 708 is configured to apply a transformation curve to the particular region to generate adjusted image data for the particular region that has an adjusted brightness, the transformation curve being selected from a plurality of transformation curves 710 based on the identified brightness of the particular region. A computer-readable storage medium 712 is configured to store the adjusted image data.

Figure 8:
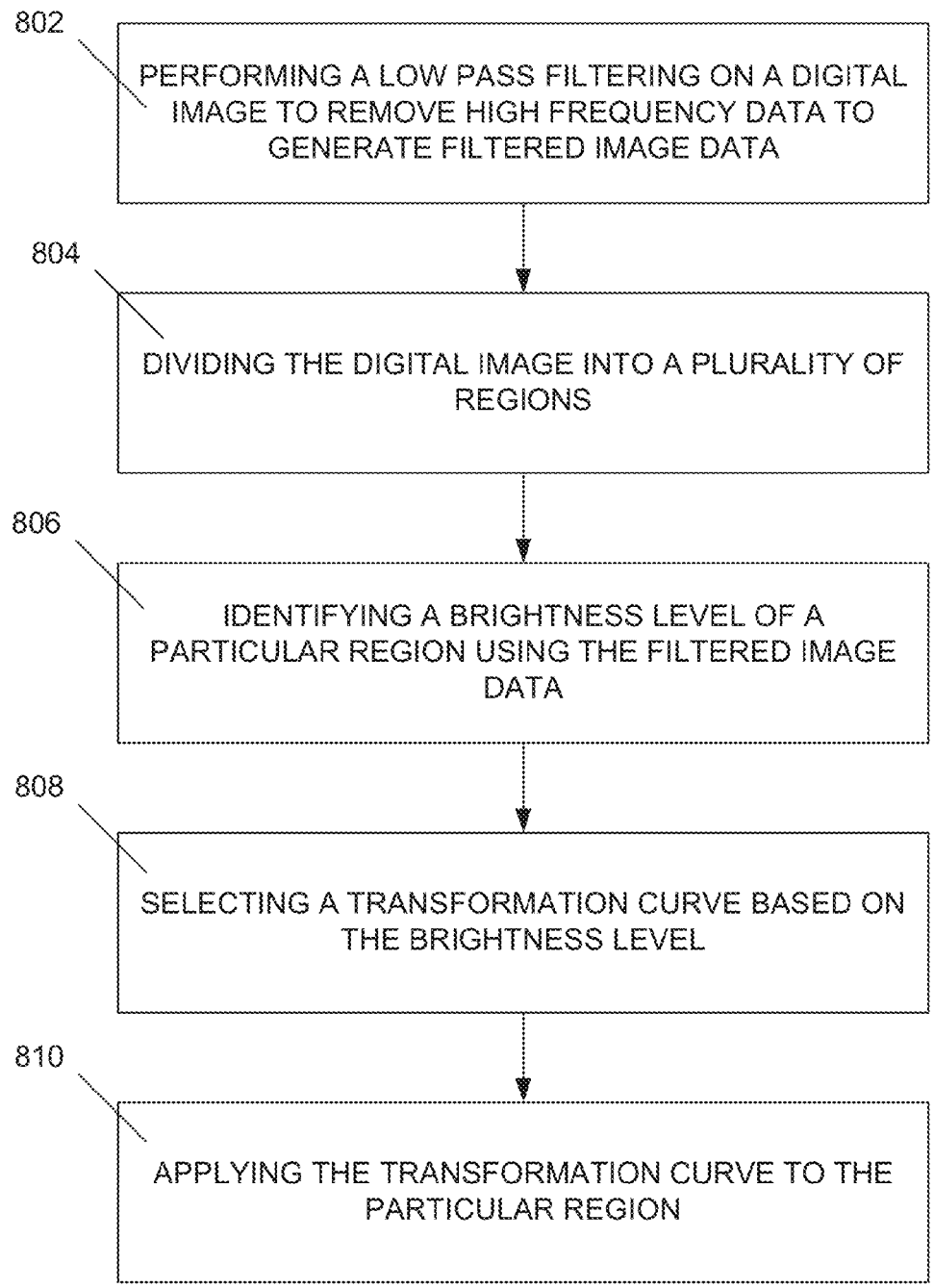
FIG. 8 is a flow diagram depicting a computer-implemented method of adjusting a digital image.

FIG. 8 is a flow diagram depicting a computer-implemented method of adjusting a digital image. At 802, a low pass filtering is performed on a digital image to remove high frequency data to generate filtered image data. At 804, the digital image is divided into a plurality of regions, and a brightness level of a particular region of the digital image is identified at 806 using the filtered image data. At 808, a transformation curve is selected for the particular region based on the brightness level, and the transformation curve is applied to the particular region at 810 to generate adjusted image data for the particular region having adjusted brightness. The adjusted image data is stored in a computer-readable medium.

This application uses examples to illustrate the invention. The patentable scope of the invention includes other examples.

It is claimed:

1. A method of adjusting a digital image, comprising:
performing a low pass filtering on a digital image to generate filtered image data;
dividing the digital image into a plurality of pixel regions, wherein each pixel region is one or more pixels in size and at a different location in the digital image;
identifying a brightness level of a particular pixel region of the digital image using the filtered image data;
selecting transformation curve for the particular pixel region based on the brightness level;
applying the transformation curve to the particular pixel region to generate adjusted image data for the particular pixel region having an adjusted brightness; and
storing the adjusted image data in a computer-readable medium.

2. The method of claim 1, wherein the transformation curve is configured to adjust a brightness of each pixel in the particular pixel region based on an unadjusted brightness of that pixel, wherein amount of adjustment is based on the unadjusted brightness of that pixel.

3. The method of claim 1, wherein the selected transformation curve is chosen from a set containing a plurality of transformation curves, wherein a particular transformation curve is selected as the selected transformation curve when the brightness level falls within a predetermined range.

4. The method of claim 3, wherein one of the plurality of transformation curves is configured to brighten one or more pixels in a region identified as a dark region.

5. The method of claim 3, wherein one of the plurality of transformation curves is configured to darken one or more pixels in a region identified as a bright region.

6. The method of claim 3, wherein the plurality of transformation curves are configured to only darken pixels in a region or only brighten pixels in a region.

7. The method of claim 3, wherein one of the plurality of transformation curves is configured not to adjust brightness of pixels in a region.

8. The method of claim 1, wherein the transformation curve is applied to an unfiltered version of the region.

9. The method of claim 1, wherein the transformation curve is applied to a filtered version of the region, wherein the high frequency data removed from the digital image by the low pass filtering is reincorporated into the adjusted image data following application of the transformation curve.

10. The method of claim 9, wherein the high frequency data is reincorporated via an addition or multiplication operation.

11. The method of claim 1, wherein a first plurality of regions of the digital image are brightened and wherein a second plurality of regions of the digital image are darkened such that a power level for displaying an unadjusted version of the digital image is substantially similar to a power level for displaying an adjusted version of the digital image.

12. The method of claim 1 wherein an unadjusted version of the digital image is associated with a first contrast range from darkest pixel to lightest pixel, wherein an adjusted version of the digital image is associated with a second contrast range from darkest pixel to lightest pixel, wherein the first contrast range is wider than the second contrast range.

13. The method of claim 1, wherein the transformation curve applied to the particular pixel region is different from another transformation curve applied to another pixel region.

14. The method of claim 1, wherein the particular pixel region is one pixel in size.

15. A computer-implemented system for adjusting a digital image, comprising:
a computer-readable storage medium configured for storage of an unadjusted digital image;
a low pass filter configured to filter the unadjusted digital image to generate filtered image data;
a brightness identification module configured to identify a brightness level of a particular pixel region of the digital image using the filtered image data;
a data processor configured to apply a transformation curve to the particular pixel region to generate adjusted image data for the particular pixel region that has an adjusted brightness, the transformation curve being selected based on the identified brightness of the particular pixel region; and
a computer-readable storage medium configured to store the adjusted image data.

16. The system of claim 15, wherein the transformation curve is configured to adjust a brightness of each pixel in the particular pixel region based on unadjusted brightness of that pixel, wherein amount of adjustment is based on the unadjusted brightness of that pixel.

17. The system of claim 15, further comprising a computer-readable storage medium configured to store a set containing a plurality of transformation curves, wherein the selected transformation curve is chosen from the set of transformation curves, wherein a particular transformation curve is selected as the selected transformation curve when the brightness level falls within a predetermined range.

18. The system of claim 15, wherein the data processor is configured to apply the transformation curve to an unfiltered version of the region.

19. The system of claim 15, wherein the data processor is configured to apply the transformation curve to a filtered version of the region, wherein the high frequency data removed from the digital image by the low pass filtering is reincorporated into the adjusted image data following application of the transformation curve.

20. The system of claim 15, wherein an unadjusted version of the digital image is associated with a first contrast range from darkest pixel to lightest pixel, wherein an adjusted version of the digital image is associated with a second contrast range from darkest pixel to lightest pixel, wherein the first contrast range is wider than the second contrast range.

* * * * *